(12) United States Patent
Buelow

(10) Patent No.: US 8,073,338 B2
(45) Date of Patent: Dec. 6, 2011

(54) MODULATION SCHEME WITH INCREASED NUMBER OF STATES OF POLARIZATION

(75) Inventor: Henning Buelow, Kornwestheim (DE)

(73) Assignee: Alcatel Lucent, Paris (FR)

( * ) Notice: Subject to any disclaimer, the term of this patent is extended or adjusted under 35 U.S.C. 154(b) by 427 days.

(21) Appl. No.: 12/384,320

(22) Filed: Apr. 2, 2009

(65) Prior Publication Data

US 2009/0257755 A1    Oct. 15, 2009

(30) Foreign Application Priority Data

Apr. 11, 2008    (EP) ..................................... 08290362

(51) Int. Cl.
*H04B 10/04*    (2006.01)
*H04J 14/06*    (2006.01)

(52) U.S. Cl. ........................... 398/184; 398/65; 398/188

(58) Field of Classification Search .................. None
See application file for complete search history.

(56) References Cited

U.S. PATENT DOCUMENTS

| | | | |
|---|---|---|---|
| 5,069,520 A * | 12/1991 | Calvani et al. ..................... 385/1 |
| 5,900,957 A * | 5/1999 | Van Der Tol ..................... 398/54 |
| 6,081,355 A * | 6/2000 | Sharma et al. ..................... 398/90 |
| 6,577,413 B1 * | 6/2003 | Saunders ......................... 398/65 |
| 6,744,992 B2 * | 6/2004 | Bergano ........................ 398/183 |
| 7,742,699 B2 * | 6/2010 | Calabro et al. ................... 398/65 |
| 7,844,186 B2 * | 11/2010 | Dorrer et al. ..................... 398/184 |
| 7,865,080 B2 * | 1/2011 | Hecker et al. .................... 398/65 |
| 7,917,031 B2 * | 3/2011 | Boffi et al. ....................... 398/65 |
| 2002/0067883 A1 * | 6/2002 | Lo ................................... 385/24 |
| 2002/0077071 A1 * | 6/2002 | Williams et al. ............... 455/130 |
| 2009/0185810 A1 * | 7/2009 | Kaplan et al. .................. 398/184 |
| 2010/0080571 A1 * | 4/2010 | Akiyama et al. ............... 398/184 |
| 2010/0111303 A1 * | 5/2010 | Finlayson et al. ............. 380/256 |
| 2011/0170870 A1 * | 7/2011 | Boffi et al. ....................... 398/65 |

OTHER PUBLICATIONS

Matalgah M.M. et al; Hybrid Frequency-Polarization Shift-Keying Modulation for Optical Transmission; Journal of Lightwave Technology; Mar. 1, 2005; pp. 1152-1163; vol. 23; No. 3, IEEE Service Center, New York, NY, USA.

G. Charlet et al; Performance Comparison of Singly-Polarized and Polarization-multiplexed at 10Gbaud under Nonlinear Impairments; OFC/NFOEC 2008 Optical Fiber Communication Conference/National Fiber Optic Engineer Conference; Feb. 28, 2008; XP002496036; San Diego, CA, USA.

Betti S. et al; Multilevel Coherent Optical System Based on Stokes Parameters Modulation; Journal of Lightwave Technology; Jul. 1, 1990; pp. 1127-1136; vol. 8, No. 7; IEEE Service Center, New York, NY, USA.

(Continued)

*Primary Examiner* — Kenneth N. Vanderpuye
*Assistant Examiner* — Rajsheed Black-Childress
(74) *Attorney, Agent, or Firm* — Carmen Patti Law Group, LLC

(57) ABSTRACT

A modulation method for optical communication comprises the step of generating an optical signal modulated between a plurality of different states of polarization and between different phase states. The plurality of states of polarization comprises first states of polarization. The first states of polarization define a single great circle on the Poincaré sphere. The method is characterized in that the plurality of states of polarization further comprise one or more second states of polarization located outside the great circle. Such additional second states of polarization increase the symbol alphabet.

11 Claims, 7 Drawing Sheets

OTHER PUBLICATIONS

Benedetto, S. et al; Multilevel Polarization Shift Keying: Optimum Receiver Structure and Performance Evaluation; IEEE Transactions on Communications; No. 2/03/04; pp. 1174-1186; vol. 42, No. 2/03/04; IEEE Service Center, Piscataway, NJ, USA.

Oriol, Bertran Pardo et al; Investigation of Design Options for Overlaying 40Gb/s Coherent PDM-QPSK Channels over a 10Gb/s System Infrastructure; Optical Fiber Communication/National Fiber Optic Engineers Conference; Feb. 24, 2008; pp. 1-3; OFC/NFOEC 2008, Conference ON, IEEE, Piscataway, NJ, USA.

Renaudier, J. et al; Linear Fiber Impairments Mitigation of 40-Gbit/s Polarization-Multiplexed QPSK by Digital Processing in a Coherent Receiver; Journal of Lightwave Technology; Jan. 1, 2008; pp. 36-42; vol. 26, No. 1; IEEE Service Center, New York, NY, USA.

Sander L. Jansen et al; Long-Haul Transmission of 16x52.5 Gbits/s Polarization-Division-Multiplexed OFDM Enabled by NIMO Processing (Invited); Journal of Optical Networking; Feb. 2008; pp. 173-182; vol. 7, No. 2; 2008 Optical Society of America; USA.

* cited by examiner

MODULATION SCHEME WITH INCREASED NUMBER OF STATES OF POLARIZATION

The invention is based on a priority application EP08290362.6 which is hereby incorporated by reference

FIELD OF THE INVENTION

The invention relates to optical communication, in particular to a modulation scheme for optical communication, wherein the optical signal is modulated between different states of polarization.

SUMMARY OF THE INVENTION

State-of-the-art optical transmission schemes using polarization division multiplexing (PDM) of two independently phase modulated signals—e.g. two QPSK (quadrature phase-shift keying) signals—have a higher spectral efficiency compared to non-polarization diverse transmission schemes. In a coherent receiver, such PDM signal may be polarization demultiplexed and distortion compensated by means of digital signal processing.

FIG. 1 illustrates a conventional PDM-QPSK transmitter. The transmitter comprises a laser generating an optical carrier signal. The optical carrier signal is split and fed to an upper IQ-modulator 2a and a lower IQ-modulator 2b. The upper IQ-modulator 2a is used for phase modulating a first polarization component (denoted as "x" in FIG. 1) of the combined optical output signal, e.g. the TE-component (TE—transversal electric). The lower IQ-modulator 2a is used for phase modulating a second orthogonal polarization component (denoted as "y" in FIG. 1) of the combined optical output signal, e.g. the TM-component (TM—transversal magnetic). Here, each IQ-modulator 2a and 2b is formed by two Mach-Zehnder interferometers (MZI) for the inphase and the quadrature components, with the output signal of a MZI assigned to the quadrature component being shifted by 90° compared to the output signal of a MZI assigned to the inphase component (see 90° phase shifter denoted by "90" in FIG. 1). Preferably, each MZI is digitally modulated between two saturation states. The saturation states denote the minimum and maximum of the sinusoidal-like transfer function describing the dependency of output field amplitude versus electrode drive voltage.

In dependency of data to be transmitted and clocked by the symbol clock, a modulation encoder 4 generates two binary signals D1-D2 for controlling the upper IQ-modulator 2a and two binary signals D3-D4 for controlling the lower IQ-modulator 2b. Each pair of binary signals selects a phase state from the four phase states of the QPSK constellation. Furthermore, at the output of the lower (or upper) IQ-modulator, a TE-TM-converter (TM-to-TE converter) is provided (not shown), converting a TE (TM) operating polarization of the lower (upper) IQ-modulator to a TM (TE) polarization. Alternatively, the input waves to the IQ-modulators 2a and 2b may already exhibit orthogonal polarizations. Both polarizations x and y are combined in a polarization combiner 3. The output signal of the polarization combiner 3 is fed in the fiber.

Provided that the two optical channels are bit aligned prior to polarization multiplexing in the polarization combiner 3, at each symbol period T the two combined signals form an optical wave having a specific state of polarization (SOP) and a specific initial phase $\phi$.

The resulting SOPs of the combined optical signal can be represented as points on a Poincaré sphere (PS). FIG. 2 shows the PS which is a sphere of radius 1, span by the Cartesian coordinate system S1, S2, and S3 in the center of the PS. The SOP on the positive S1 axis denotes a linear, 0° polarization (TE polarization), the opposite polarization point corresponds to the orthogonal SOP, i.e. the linear, 90° polarization (TM polarization). The positive S2 axis points at a linear polarization with 45 degree elevation, the negative S2 axis to the linear polarization with −45 degree elevation. North and south poles of the PS correspond to left hand and right hand circular polarizations, respectively. All points on the sphere besides the poles and points on the equator identify elliptical states of polarization.

FIG. 3 illustrates the four possible SOP1-4 of a combined PDM-QPSK signal at the output of the transmitter. In case the two QPSK signals do exhibit an optical phase offset $\psi$ between each other, the four SOPs are rotated around the S1 axis (with a rotation of $2\cdot\psi$). The four possible SOPs are located in a common plane of the PS, with the common plane having the same center as the PS. In other words, the four possible SOPs define exactly one great circle (see the great circle 10) on the PS, with the great circle having the same circumference as the PS and being the largest circle that can be drawn on the PS.

In dependency of the difference between the modulated phases of both QPSK component signals, each of the SOPs exhibits an initial phase $\phi_1$, $\phi_2$, $\phi_3$ or $\phi_4$ which can be illustrated in a constellation diagram as four points in a complex plane, i.e. each SOP can be modulated between the 4 phases. In FIG. 3 at each of the four SOPs a QPSK phase constellation IQ1-IQ4 is attached, thereby illustrating the four possible phases $\phi_1$-$\phi_4$. Hence, the symbol alphabet of the joint symbol at the output of the PDM-QPSK transmitter in FIG. 1 consists of 16 different symbols, i.e. 16 different waves, which can be written as complex fields E(k, m):

$$E(k, m) = a(SOPk) \cdot e^{j\phi_m}.$$

The term "a(SOPk)" represents the Jones vector belonging to SOPk, with k=1, . . . , 4, and the term "$\phi_m$" (with m=1, . . . , 4) describes the initial phase.

Assuming that the variables k and m are determined by a first pair of bits $b_0$ and $b_1$ and a second pair of bits $b_2$ and $b_3$, respectively, each joint symbol transports 4 bits of information.

When transferring high data rates, e.g. 40 Gb/s, 100 Gb/s or even higher, and bridging long transmission spans, e.g. several 100 km or even 1000 km, via such PDM-QPSK transmission system using existing fiber infrastructure, the system is operated at its sensitivity limit, although using coherent detection to enable lower symbol rate and powerful electronic equalization.

SUMMARY OF THE INVENTION

Hence, it is an object of the present invention to provide a polarization and phase diverse modulation scheme which provides increased sensitivity at such high data rate. Further objects of the invention are providing a corresponding method for receiving, a corresponding transmitter and a corresponding receiver.

These objects are achieved by the methods, the transmitter and the receiver according to the independent claims.

According to a first aspect of the invention, a modulation method for optical communication comprises the step of generating an optical signal modulated between a plurality of different states of polarization and between different phase states (with same or different amplitude). The states of polarization do not lie on a common great circle on the Poincaré sphere.

Preferably, the plurality of states of polarization comprises first states of polarization, e.g. SOP1-4 in FIG. 3. The first states of polarization define a single great circle on the Poincaré sphere, e.g. the great circle 10 in FIG. 3. The plurality of states of polarization further comprise one or more second states of polarization located outside the great circle, i.e. the constellation points of the second states of polarization do not lie in the plane spanned by the vectors from the center of the sphere to the first states of polarization.

Such additional second states of polarization increases the symbol alphabet, e.g. from 16 PDM-QPSK symbols (4·4) to 24 symbols (6·4) when two additional second states of polarization are provided and 4 phases per polarization state are used. Due to the increase of the symbol alphabet more data per joint optical symbol may be encoded, i.e. the number of transmitted bits per symbol may be increased by not only using two independently multiplexed orthogonal polarization components as in case of PDM-QPSK. However, due to the additional degree of freedom introduced by occupying not only a great circle on the PS by SOPs but using more of the surface of the sphere, the information per symbol is increased with no or only low additional OSNR (optical signal-to-noise ratio) penalty, i.e. the OSNR is not reduced at all or only minimally reduced.

When transmitting the same data rate as in a modulation scheme using only the first states of polarization, the symbol rate may be reduced due to the higher information content per symbol, thereby reducing the signal bandwidth and increasing the sensitivity. Alternatively, the symbol rate can be kept and redundancy may be used to increase the sensitivity without reducing the net data rate. The higher gross data rate data may be used for encoding the data pursuant to an error correction algorithm (e.g. FEC—forward error correction). Thus, the additional bits may be used to apply FEC encoding and decoding in the transmitter and receiver, respectively. The coding gain of the FEC would reduce the bit error rate (BER) at the decoder output and hence improve the sensitivity of the receiver. Moreover, coded modulation, which is established in wireless transmission and which e.g. combines the modulation of a QAM constellation by FEC coding, can also be applied to the extended combined constellation of polarization and phase. Due to the additional degrees of freedom introduced by the polarization state modulation, such a coded modulation enables improved performance.

It should be noted that each polarization state may exhibit—in addition to a plurality of phases—also a plurality of amplitudes (QAM—quadrature phase modulation), i.e. modulation between different phase states includes also phase and amplitude modulation (QAM). Alternatively, the amplitude is constant for all constellations points as in case of QPSK.

According to a preferred embodiment, the method provides two second states of polarization which are orthogonal to each other. The two second states of polarization may be located on the line perpendicular to the midpoint of the great circle. In particular, the two second states of polarization may be the linear 0° and 90° states of polarization (TE and TM states of polarization).

In case of QPSK modulation, the first states of polarization may comprise two pairs of states of polarization, each pair comprising two states of polarization orthogonal to each other (see e.g. pair SOP1 and SOP3 and pair SOP2 and SOP4 in FIG. 3). Preferably, the first states of polarization are the right-handed (see SOP4 in FIG. 3) and left-handed (see SOP2) circular states of polarization as well as the +45° (see SOP1) and −45° (see SOP3) linear states of polarization.

However, the entirety of the 6 states of polarization may be rotated. E.g. when using two signals assigned to the two orthogonal polarizations components of the optical signal and exhibiting a phase offset ψ between each other, a rotation of the states of polarization around the S1 axis (with a rotation of 2·ψ) would occur. Nevertheless, the relative orientation (e.g. 90° angles in FIG. 3) of the different SOPs determine the performance of the modulation.

For providing second states of polarization (e.g. the TE and TM polarizations), the inventive method may selectively deactivate one of two orthogonal polarization components of the output signal. Thus, when deactivating one polarization component (e.g. the TE component), the optical output signal only comprises the polarization component assigned to the other polarization component (e.g. TM component).

Similar to the PDM-QPSK transmitter in FIG. 1, the inventive method comprises the basic steps of phase modulating two optical waves and polarization combining the phase modulated optical waves. The optical waves should preferably be bit aligned before polarization combining. Preferably, a step of polarization conversion for one of the two waves is in between. E.g. at the output of the lower (or upper) IQ-modulator in FIG. 1, TE-TM converting (TM-to-TE converting) may be provided for converting a TE (TM) operating polarization of the lower (upper) IQ-modulator to a TM (TE) polarization. Alternatively, the input waves before phase modulation may already exhibit orthogonal polarizations.

For providing second states of polarization (e.g. the TE and TM polarizations), the method may further comprise the step of selectively deactivating one of the two optical waves assigned to two orthogonal polarization components of the optical output signal. The deactivating means may set the respective field component to 0. Thus, when deactivating one wave assigned to one polarization component, the optical output signal only comprises the polarization component assigned to the other polarization component. To keep the optical power constant for such symbol, the (remaining) other polarization component may be set to have an amplitude of √2 times the amplitude of a component for the bit aligned PDM-QPSK modulations (SOP1-4 in FIG. 3).

Preferably, the optical signal is modulated between 6 states of polarization (instead of 4 states of polarization in case of PDM-QPSK) and between 4 phase states in each state of polarization, resulting in a number of 24 different symbols. It is not necessary that the plurality of 4 phase states is identical for each state of polarization. Preferably, the phase states in the two second states of polarization are rotated by 45° compared to the phase states in the first states of polarization. It can be shown that this measure increases the Euclidian distance between the different symbols.

Instead of encoding 4 bits per symbol as in case of PDM-QPSK, in average more than 4 bits are encoded per symbol since 24 different symbols are available. This means that up to $\log_2(24)=4.58$ bits can be transported per symbol. Preferably, 9 bits are encoded per two optical symbols (instead of 8 bits in case of PDM-QPSK). This enables to transport 4.5 bits/symbol which is close to the maximum attainable value. These 9 bits per two symbols instead of 4 bits/symbol in case of PDM-QPSK mean an increase of 9/8=12.5% more information when keeping the symbol rate (without reducing the sensitivity).

Two consecutive optical symbols may form a super symbol and 9 bits may be jointly mapped to a super symbol.

When providing the same data rate as PDM-QPSK and encoding 9 bits per two optical symbols, the symbol rate can be reduced to 8/9≈89%. This provides theoretically an improvement of the OSNR by roughly 0.5 dB (without additional error correction) and reduces the speed requirements, in particular for the electronic circuits.

Alternatively, the symbol rate can be kept and the additional bits per symbol may be used for error correction coding, thereby increasing the sensitivity and gaining additional margin. E.g. the bits may be used to apply a FEC scheme, with ⅛=12.5% or lower data overhead. A Reed-Solomon (RS) code where the 9 super symbol bits correspond to a symbol processed within the FEC may be be applied, e.g. RS (511, 455) having 12.3% redundancy.

Also, coded modulation (e.g. Trellis coded modulation) may be applied in connection with the proposed modulation scheme having an extended constellation scheme.

It should be noted that same or all of the above discussed measures may be also used (to a reduced extent) in combination.

The inventive modulation method may be also used in connection with OFDM (orthogonal frequency-division multiplexing). Phase, polarization and optionally amplitude may be used as signal space for defining symbols.

Generally, OFDM systems are under discussion for future transmission systems exceeding the capabilities of coherent PDM-QPSK systems. When transferring high data rates, e.g. 40 Gb/s or 100 Gb/s, and bridging long transmission spans, e.g. several 100 km or even 1000 km, via a conventional OFDM transmission system using existing fiber infrastructure, the system is limited by the receiver sensitivity.

The inventive method may generate an OFDM signal comprising a plurality of combined subcarrier signals. Each combined subcarrier signal may be subdivided in an x polarization component subcarrier and a y polarization component subcarrier (y polarization orthogonal to x polarization), both at the same frequency. Thus, in the narrow spaced wavelength grid of the plurality of subcarriers, each wavelength of the grid is occupied by two subcarriers, one for x and one for the orthogonal y polarization. The inventive modulation method, preferably by using said second states of polarization, may be applied to each combined subcarrier signal. Thus, the combined subcarrier signals are modulated in polarization and phase. Thus, modulation of phase, optionally amplitude and (which is new) of polarization is applied to the individual subcarriers signals. Preferably, each phase modulated subcarrier signal is individually polarization modulated using said second states of polarization (in addition to the first states of polarization), leading to the same advantages as discussed above, in particular to an increase of the sensitivity compared to conventional PDM-OFDM systems.

It should be noted that basically the above mentioned embodiments of the invention can be arbitrarily combined. Furthermore, it should be noted that the disclosure of the invention also covers other claim combinations than the claim combinations which are explicitly given by the back references in the dependent claims, i.e. the claims can be basically combined in any order.

A second aspect of the invention relates to a corresponding method for receiving an optical signal as generated by the modulation method as discussed above. The method for receiving may jointly decide the orthogonal polarization components of at least one symbol (i.e. the received polarization components are not separately decided). Moreover, it also may jointly decide more than one symbol (e.g. two symbols) of the optical signal. In particular, the method for receiving may jointly decide two consecutive symbols forming a super symbol and carrying 9 bits as discussed above.

A third aspect of the invention is directed to a corresponding transmitter for optical communication. Such transmitter comprises means for generating an optical signal modulated between a plurality of different states of polarization and between different phase states. The plurality of states of polarization comprises first states of polarization and second states of polarization as discussed above.

For providing second states of polarization (e.g. the TE and TM polarizations), the transmitter may comprise means for selectively deactivating one of two orthogonal polarization components of the output signal. Thus, when deactivating one polarization component (e.g. the TE component), the optical output signal only comprises the polarization component assigned to the other polarization component (e.g. TM component).

Similar to the PDM-QPSK transmitter in FIG. 1, the inventive transmitter may comprise means for phase modulating two optical waves (see e.g. IQ-modulators 2a and 2b in FIG. 1) and—downstream of the means for phase modulating—means for polarization combining (see e.g. polarization combiner 3). Optionally, a polarization converter (e.g. a TE-to-TM converter) for one of the two waves may be located in between. Alternatively, the two optical waves have already orthogonal polarizations before fed to the means for phase modulating. The two optical waves may be assigned to two different orthogonal polarization components (e.g. TE and TM) of the optical output signal.

The means for phase modulating may be formed by four MZIs as discussed in connection with FIG. 1.

For providing second states of polarization (e.g. the TE and TM polarizations), the transmitter may be configured to selectively deactivate the TE polarization component or the TM polarization component of the output signal. Thus, the transmitter may provide means for selectively deactivating one of the two waves assigned to two orthogonal polarization components (e.g. TE and TM components) of the optical output signal. The means for deactivating may be also provide a state when the means do not deactivate one of the two polarization components. The means for selectively deactivating may be part of the means for phase modulating. The transmitter may selectively dim one of the two waves.

In particular, the transmitter may comprise an intensity modulator for intensity modulating the two optical waves between 3 intensity states. The intensity modulator may be located upstream or downstream of the means for phase modulating. In the $1^{st}$ intensity state both waves have essentially the same (high) intensity, in the $2^{nd}$ intensity state one wave has high intensity and the other one wave has low or zero intensity, and in the $3^{rd}$ intensity state the one wave has low or zero intensity and the other one wave has high intensity.

In the $1^{st}$ intensity state, the conventional polarization constellation points are selected (see e.g. SOP1-4 in FIG. 3 in case of QPSK modulation). In the $2^{nd}$ and the $3^{rd}$ intensity states, one of the two second states of polarization is selected.

In addition to the deactivating means, a modulation encoder may be provided, which receives data to be transmitted and is configured to generate—in dependency on the data—modulation signals fed to the means for phase modulating and to the deactivating means. Preferably, the signals fed to the means for phase modulating are binary signals. In this case when using MZIs for phase modulation, each MZI is switched between two saturation states.

Instead of using an intensity modulator, one may compute the optical fields of both polarization paths of the transmitter in the electrical domain and generate the transmitter field via the means for phase modulating. In this case, a modulation encoder preferably generates—in dependency on the received data—non-binary, in particular analog modulation signals fed to the means for phase modulating, with the non-binary modulation signals selecting the state of polarization.

According to a different embodiment, an additional polarization modulator may be provided. Preferably, the polarization modulator is located downstream of the means for polarization combining. The polarization modulator may be implemented as a polarization switch which is configured to switch to one of the second states of polarization. E.g. a switchable quarter wave plate may be used, which is capable of converting circular polarized light to linear polarized light, thereby transforming one of the first states of polarization to one of the second states of polarization. E.g. the circular polarizations SOP2 and SOP4 in FIG. 3 may be converted to the linear 0 and 90° states of polarization (SOP5 and SOP6 in FIG. 4).

Further, a modulation encoder may be provided in addition to the polarization modulator. Such modulation encoder receives data to be transmitted and is configured to generate—in dependency on the data—modulation signals fed to the means for phase modulating and the polarization modulator. Preferably, the modulation signals are binary signals.

The inventive transmitter may be also configured to generate an OFDM signal, each subcarrier signal (comprising one subcarrier for a first polarization component and one subcarrier for a second, orthogonal polarization component) modulated as discussed above. In particular, the second states of polarization may be used as discussed above.

A fourth aspect of the invention relates to a receiver for receiving an optical signal as generated by the modulation method as discussed above.

Preferably, such receiver is a coherent receiver and configured to process two orthogonal polarizations of the received signal as a joint symbol (and not individually) and to jointly decide orthogonal polarization components of one or more symbols of the optical signal, e.g. 2 symbols encoding 9 bits forming a super symbol. Thus, the received polarization components are not separately decided. Such receiver may comprise electronic polarization demultiplexing and/or electronic distortion equalization. In contrast to electronic polarization demultiplexing, optical polarization multiplexing may be alternatively used.

The receiver may be also configured to receive an OFDM signal as discussed above.

The above remarks related to a particular aspect of the four aspects of the invention are basically also applicable to the respectively other aspects of the invention.

BRIEF DESCRIPTION OF THE DRAWINGS

The invention is explained below in an exemplary manner with reference to the accompanying drawings, wherein.

DETAILED DESCRIPTION OF THE INVENTION

Figure 1:
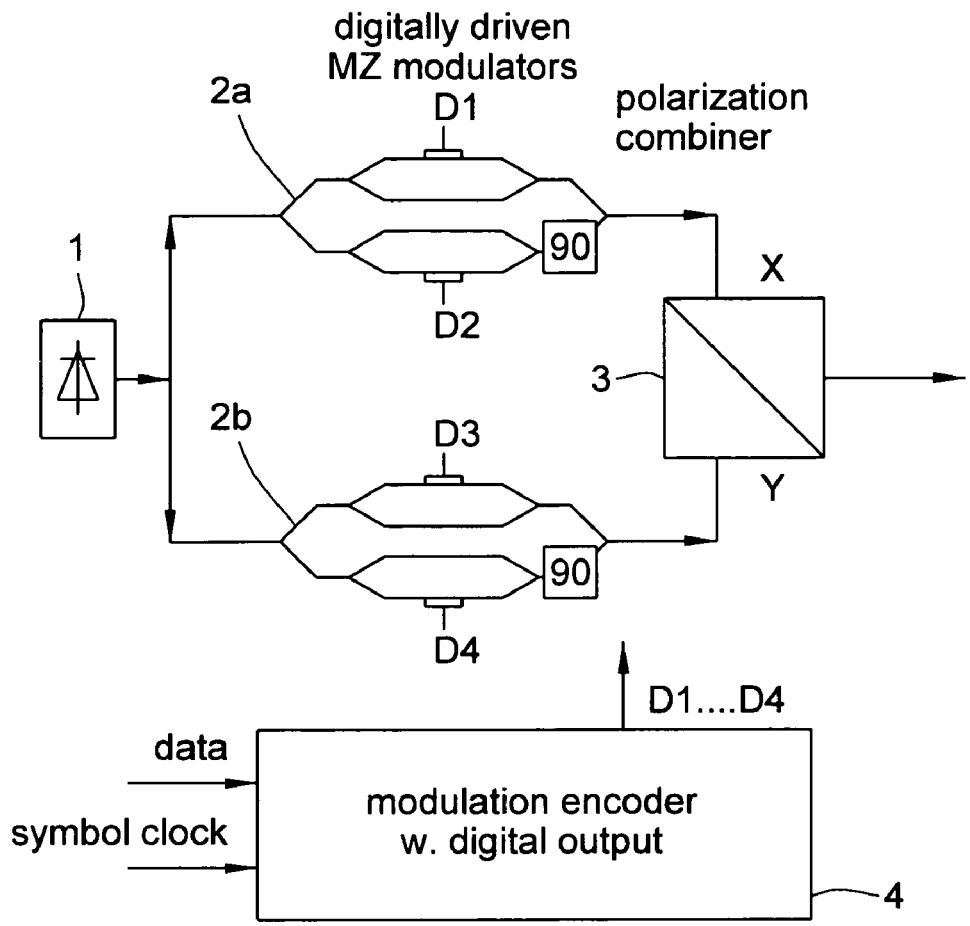
FIG. 1 illustrates a conventional PM-QPSK transmitter.
Figure 2:
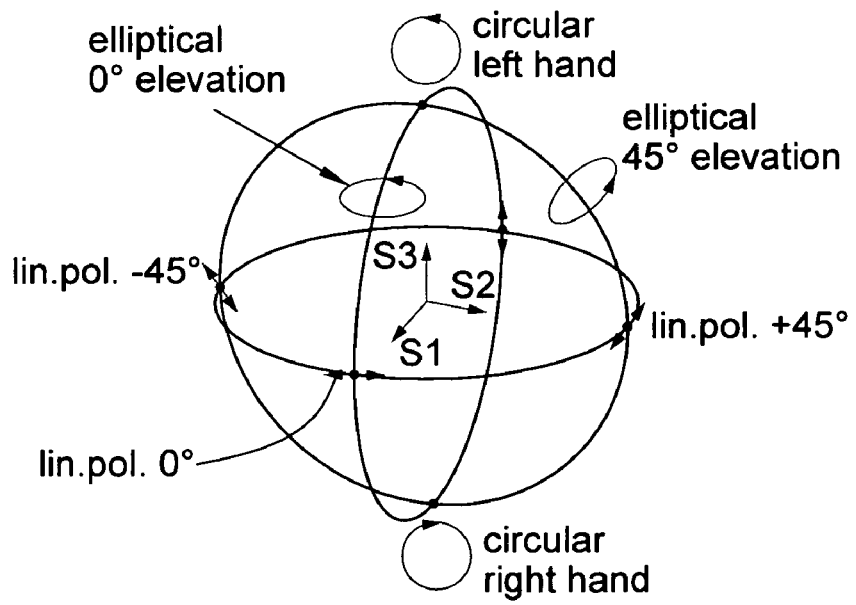
FIG. 2 illustrates the location of SOP1-6 on the Poincaré sphere.
Figure 3:
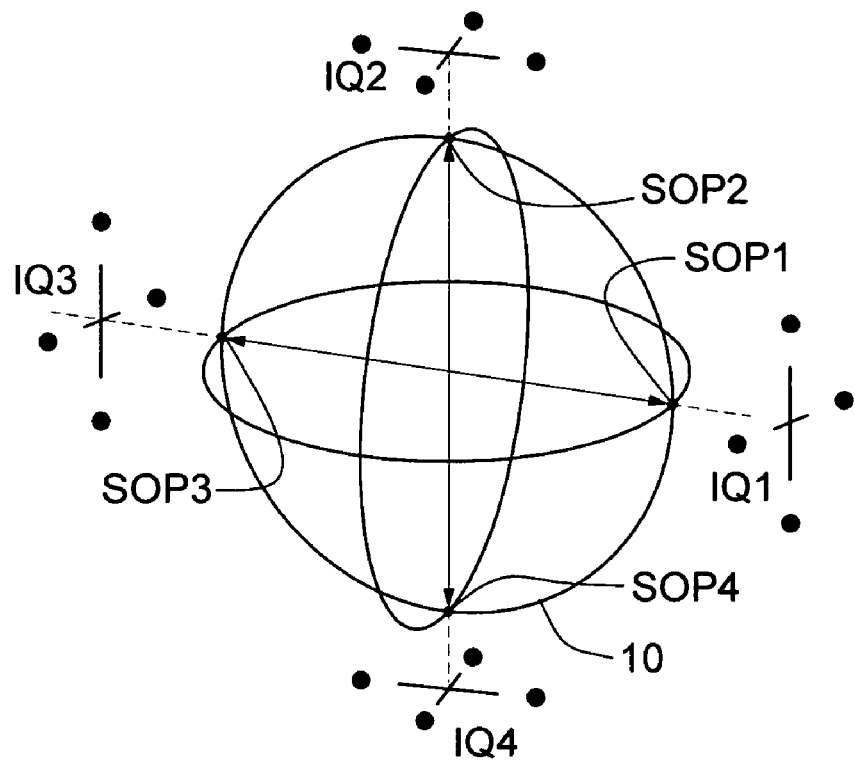
FIG. 3 illustrates the location of the four states of polarization SOP1-4 of the PM-QPSK modulation scheme on the Poincaré sphere and the four phase states in each state of polarization.
Figure 4:
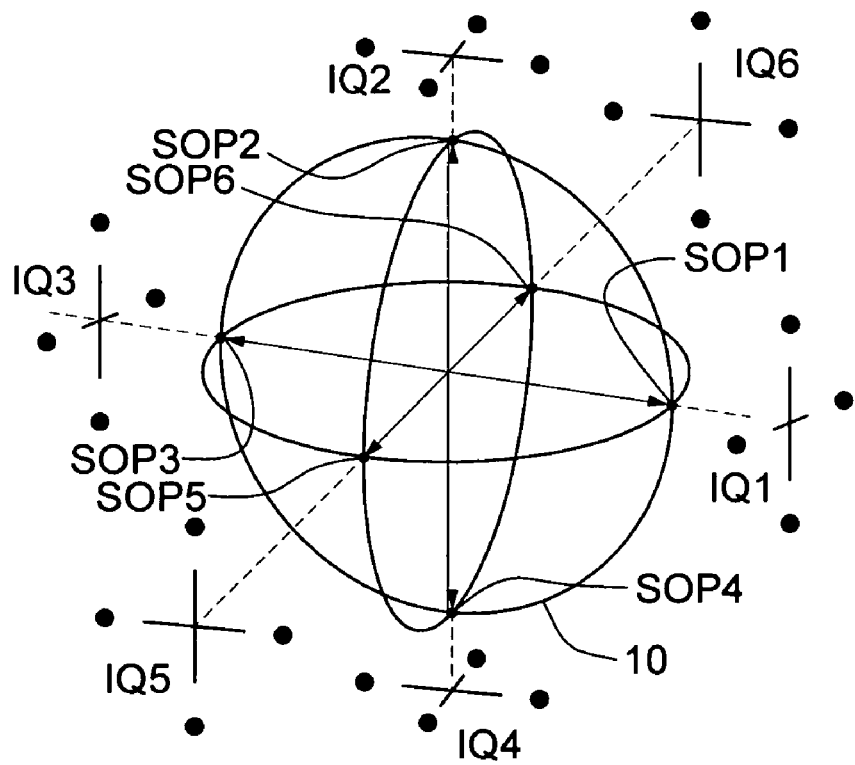
FIG. 4 illustrates the constellation of a POL-QAM 6/4 modulation scheme.

FIGS. 1 to 3 were already discussed above. FIG. 4 illustrates the constellation of the POL-QAM 6/4 modulation scheme as an exemplary embodiment of the inventive modulation scheme. In addition to the 4 SOPs each having 4 phase constellation points in case of PDM-QPSK (see FIG. 3), in POL-QAM 6/4 two additional polarizations states (see SOP5 and SOP6 in FIG. 4) are added which do not lie in the plane defined by SOP1-SOP4. Thus, POL-QAM 6/4 uses 6 SOPs each having 4 IQ-constellation points. Here, the linear 0° (TE) and 90° (TM) states of polarization are used as additional states of polarization. However, the entirety of SOP1-6 may be rotated on the sphere such that the relative distance between the states of polarization remains the same. E.g. in case the two polarization components forming the POL-QAM 6/4 signal exhibit a phase offset $\psi$ between each other, SOP1-4 are rotated around the S1 axis in FIG. 2 (with a rotation of $2\cdot\psi$).

Joint PDM-QPSK symbols may be described as:

$$\text{symbol}=\text{SOP}x\cdot(e^{j0},e^{j\pi/2},e^{j\pi},e^{j3\pi/2}), \text{ with } x=1,\ldots,4.$$

Similarly, joint POL-QAM 6/4 symbols may be described as $$\text{symbol}=\text{SOP}x\cdot(e^{j0},e^{j\pi/2},e^{j\pi},e^{j3\pi/2}), \text{ with } x=1,\ldots,6.$$

However, preferably, the phase states of SOP5 and SOP6 are rotated by 45° compared to the phase states in SOP1-SOP4 (see FIG. 3), i.e. the phase states are not identical for SOP1-SOP4 and SOP5-SOP6. It can be shown that this increases the Euclidian distance between the different symbols.

The additional SOPs 5 and 6 (here corresponding to TE and TM output waves) extend the alphabet of symbols from 16 symbols (4 SOPs each having 4 IQ constellation points) to 24 symbols (6 SOPs each having 4 IQ constellation points). Hence, the maximum information which can be carried by a symbol increases from $\log_2 16=4$ bits/symbol to $\log_2 24=4.58$ bits/symbol.

It should be noted that the inventive modulation scheme is not limited to 4 initial phases (as in case of QPSK) per state of polarization and may use a higher number of phases, e.g. 8 phases in case of 8 PSK or 12 phases in case of 16-QAM (quadrature amplitude modulation). In case of 8 phases, the inventive method provides 8 SOPs on the great circle 10 and the two additional SOP5 and SOP6 outside the great circle 10. Thus, also SOPs different to the 6 SOPs discussed so far, can form the signals for the symbol alphabet, e.g. 8 SOPs not lying on a common great circle or 4 SOPs forming a tripod on the PS.

Figure 5:
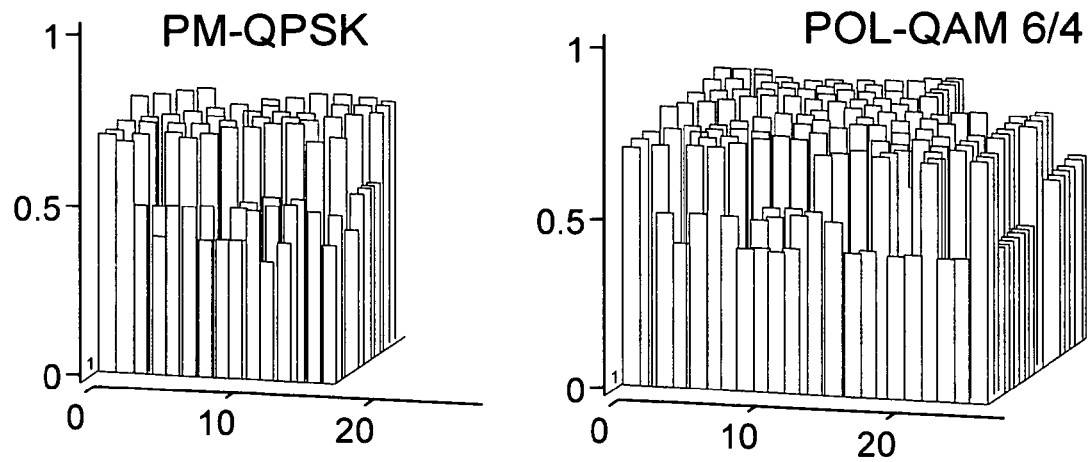
FIG. 5 illustrates the inverse of the Euclidian distance for all 16·16 combinations of two symbols in case of PM-QPSK (see left diagram) and all 24·24 combinations in case of POL-QAM 6/4 (see right diagram)

FIG. 5 illustrates the inverse of the Euclidian distance for all combinations of two symbols in case of PM-QPSK (see left diagram) and in case of POL-QAM 6/4 (see right diagram). The symbol alphabet for PM-QPSK comprises 16 symbols, thus, the left diagram shows 16·16 bars, whereas the symbol alphabet of POL-QAM 6/4 comprises 24 symbols resulting in 24·24 bars in the right diagram. The right diagram for POL-QAM 6/4 shows no bars higher than the bars in the left diagram for POL-QAM. The same maximum heights of the bars prove the same minimum Euclidian distance in both cases. Thus, the OSNR penalty remains unchanged when moving from PM-QPSK to POL-QAM 6/4. Thus, POL-QAM 6/4 extends the number of possible symbols from 16 to 24 without degradation of the OSNR sensitivity.

There exist many alternatives to map a number of information bits on the optical wave states forming the symbol alphabet. In the following a simple mapping of 9 information bits on two consecutive symbols (which form a super symbol) is explained in exemplary manner. In this case the transmitted information rate is 9 bits/2 symbols=4.5 bits/symbol. This value is slightly below the maximum achievable value of 4.58 bits/symbol.

A wave state of a super symbol comprising two consecutive symbols—symbol 1 and symbol 2—is formed by the orthogonal TE, TM polarization components x1, y1 of symbol 1 and the orthogonal TE, TM polarization components x2, y2 of symbol 2. Both polarization components are combined in a polarization beam combiner of the transmitter (see combiner 3 in FIG. 1). The waves x1, y1, x2, and y2 are modulated by IQ-modulators (see IQ-modulator 2a and 2b in FIG. 3). Two bits b1 and b2 may determine the complex output wave of a polarization component by IQ(b1,b2)=(b1−0.5)+j(b2−0.5). IQ(b1,b2) describes a QPSK constellation point with the amplitude 1.

Table 1 below shows the mapping of 9 bits b0-b1 to an optical super symbol formed by two consecutive optical symbols. In the transmitter mapping table e.g. the term "x1" in IQ$_{x1}$(b1,b2) indicates that for symbol 1 the TE(=x) polarization is modulated by a QPSK constellation point determined by the bits b1 and b2. In case that one of the additional SOPs (SOP5 and SOP6) is excited (i.e. the transmitter output signal carries either only a TE (x) or a TM (y) polarization component, y1/2=0 or x1/2=0), the amplitude of the associated IQ-modulator is increased by the factor of $\sqrt{2}$ to keep the signal power at the same level(=1) as for the PDM-QPSK modulation. As evident from Tab. 1, only one of the two symbols within a super symbol may be in SOP5 or SOP6.

TABLE 1

| | | | Example for mapping 9 bits to a super symbol | | | | | |
|---|---|---|---|---|---|---|---|---|
| b0 | b1 | b2 | b3 | b4 | b5 | b6 | b7 | b8 |
| 0 | IQ$_{x1}$(b1, b2) | | IQ$_{y1}$(b3, b4) | | IQ$_{x2}$(b5, b6) | | IQ$_{y2}$(b7, b8) | |
| 1 | 0 | 0 | $\sqrt{2}$ · IQ$_{x1}$(b3, b4), y1 = 0 | | IQ$_{x2}$(b5, b6) | | IQ$_{y2}$(b7, b8) | |
| | | 1 | $\sqrt{2}$ · IQ$_{y1}$(b3, b4), x1 = 0 | | | | | |
| | 1 | 0 | $\sqrt{2}$ · IQ$_{x2}$(b3, b4), y2 = 0 | | IQ$_{x1}$(b5, b6) | | IQ$_{y1}$(b7, b8) | |
| | | 1 | $\sqrt{2}$ · IQ$_{y2}$(b3, b4), x2 = 0 | | | | | |

With this mapping of two bits to an IQ constellation the decision in the receiver becomes easy. At the receiver, the following decisions are performed: Di$_1$=|x1|−|y1| and Di$_2$=|x2|−|y2|, with Di$_{1,2}$ denoting the difference between the signal amplitude (magnitude) of x1,2 and y1,2. Each difference result Di$_{1,2}$ is in one of three states. Thus, Di$_{1,2}$ is 0 if SOP1-4 are transmitted (FIG. 3), and Di$_{1,2}$ is +1 or −1 if SOP5-6 are transmitted.

The decision process at the receiver is illustrated in Tab. 2. The decision in the receiver may be realized in a DSP. The decision process is based on determining and analyzing Di$_{1,2}$. In case both Di$_1$ and Di$_2$ are 0, then b0=0 and only SOP1-4 are used for both symbols of the super symbol. In this case e.g. the two bits b1, b2 are determined by the decision dec(x1). The term "dec(x1)" denotes the two decisions required to extract the two bits b1 and b2 from the received constellation point transported by the component wave x1, i.e. b1=result of (Re (x1)>0) and b2=result of (Im(x1)>0). Similarly, the other bits b3-b8 are determined.

In case of Di$_1$≠0 or Di$_2$≠0, b0 corresponds to 1, i.e. one of SOP5 and 6 were used for one symbol of the current super symbol. Further, one has to check whether Di$_1$≠0 or alternatively Di$_2$≠0. In case Di$_1$≠0, b1 corresponds to 0. Alternatively, b1 corresponds to 1. In dependency of the value of Di$_{1,2}$ also b2 is decided (see third column in Tab. 2). The remaining bits b3-b8 are determined as indicated in the fourth to seventh columns.

TABLE 2

| Mapping of decisions on super symbol to 9 bits in receiver. | | | | | | |
|---|---|---|---|---|---|---|
| Di$_1$ = Di$_2$ = 0 ⇒b0 = 0 (Di$_1$≠0)∨(Di$_2$≠0) ⇒b0 = 1 | Di$_1$≠0 ⇒ b1 = 0 Di$_2$≠0 ⇒ b1 = 1 | (Di$_1$ = ±1)∨ (Di$_2$ = ±1) | dec(x1) | dec(y1) | dec(x2) | dec(y2) |
| b0 = 0 | | | b1, b2 | b3, b4 | b5, b6 | b7, b8 |
| | b1 = 0 | Di$_1$ = 1 ⇒ b2 = 0 | b3, b4 | | b5, b6 | b7, b8 |
| b0 = 1 | | Di$_1$ = −1 ⇒ b2 = 1 | | b3, b4 | b5, b6 | b7, b8 |
| | b1 = 1 | Di$_2$ = 1 ⇒ b2 = 0 | b5, b6 | b7, b8 | b3, b4 | |
| | | Di$_2$ = −1 ⇒ b2 = 1 | b5, b6 | b7, b8 | | b3, b4 |

The subsequent transmitter embodiments in FIGS. 6, 7, 9 and 10 may use the mapping scheme in Tab. 1 for determining the modulation signals.

Figure 6:
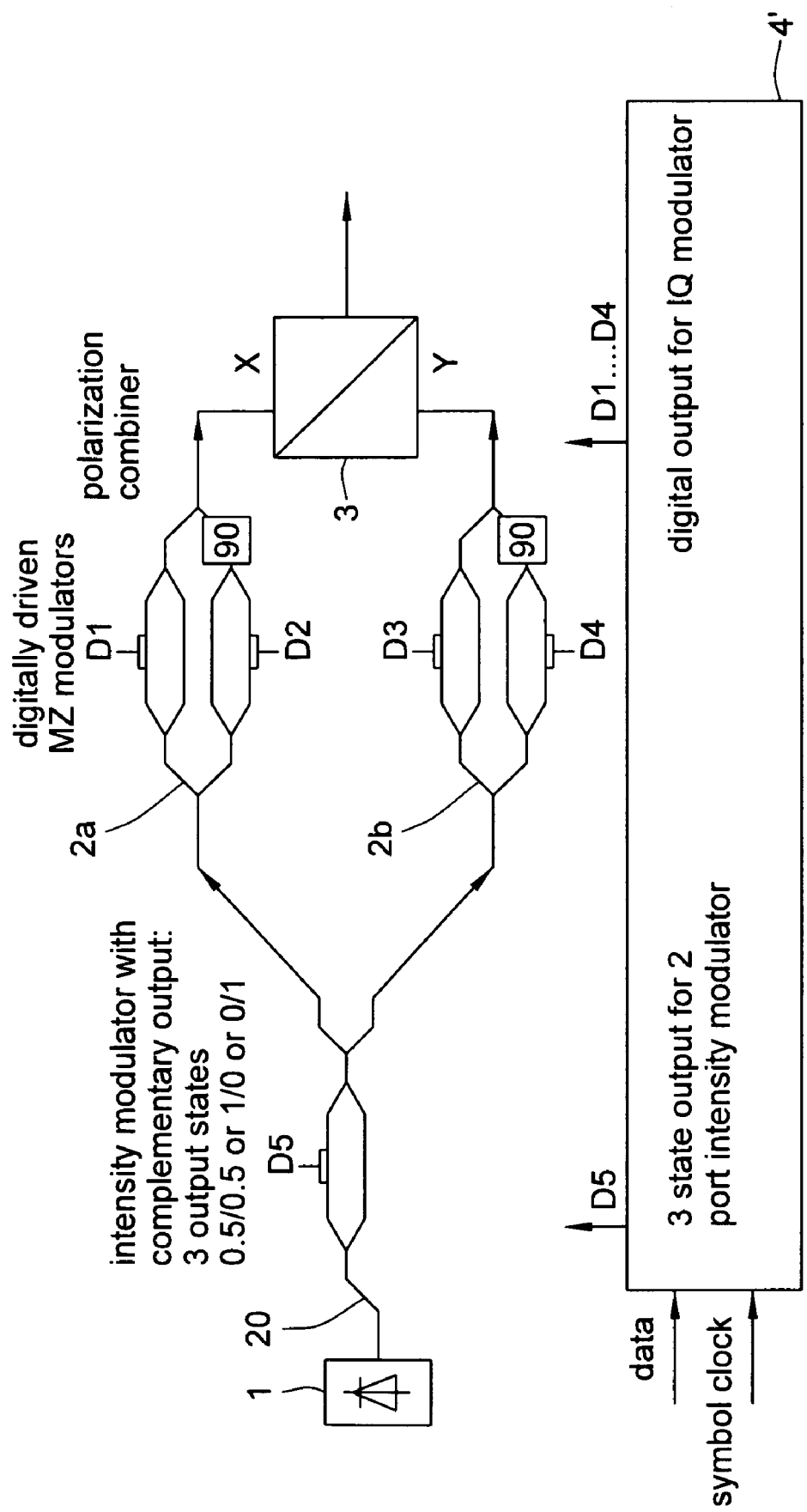
FIG. 6 illustrates a first embodiment of a POL-QAM 6/4 transmitter.

A first embodiment of a transmitter for generating an optical signal modulated between all 6 SOPs is illustrated in FIG. 6. The POL-QAM 6/4 transmitter in FIG. 6 is based on the PM-QPSK transmitter in FIG. 1 and e.g. may be configured to transport 40 Gb/s or 100 Gb/s data rates. Figurative elements in FIGS. 1 and 6 denoted by the same reference signs are basically the same. In addition to the elements in FIG. 1, the POL-QAM 6/4 transmitter comprises an intensity modulator 20 which is configured to selectively dim one of the two optical waves fed to the optical polarization combiner 3. In FIG. 6 the intensity modulator 20 is realized as an MZI and intensity modulation is performed upstream of the IQ-modulators 2a and 2b, i.e. at the inputs of IQ-modulators 2a and 2b. However, intensity modulation may be also performed downstream of the IQ-modulators 2a and 2b.

The intensity modulator 20 in FIG. 6 has two complementary outputs, i.e. the intensity at the upper output fed to the upper modulator 2a is complementary to the intensity at the lower output fed to the lower modulator 2b. Here, a three-state intensity modulator 20 is used, i.e. the modulator 20 modulates the two optical waves between 3 intensity states. In the 0.5/0.5 intensity state both waves have essentially the same (high) intensity, in the 1/0 intensity state the upper wave (fed to the upper modulator 2a) has high intensity and the lower wave (fed to the upper modulator 2b) has very low or zero intensity, and in the 0/1 intensity state the upper wave has very low or zero intensity and the lower wave has high intensity. Preferably, in the 1/0 and 0/1 states the intensity modulator operates in saturation.

In the 0.5/0.5 intensity state, the conventional polarization constellation points are selected (see e.g. SOP1-4 in FIG. 3 in case of QPSK modulation). In the 1/0 and 0/1 intensity states, the two additional states of polarization are selected. If e.g. the upper path is assigned to the TE polarization with 0° polarization angle and the lower path is assigned to the TM polarization with 90° polarization angle, dimming the upper wave (0/1 state) results in SOP6 (TM polarization), whereas dimming the lower wave (1/0 state) results in SOP5 (TE polarization).

Similar to FIG. 1, the modulation encoder 4' generates two binary signals D1-D2 for controlling the upper IQ-modulator 2a and two binary signals D3-D4 for controlling the lower IQ-modulator 2b. Each pair of binary signals select a phase state from the four phase states of the QPSK constellation.

The modulator encoder 4' further generates the modulation signal D5 fed to the intensity modulator 2. The modulator signal D5 is a three-state signal for selecting each of the three states.

Figure 7:
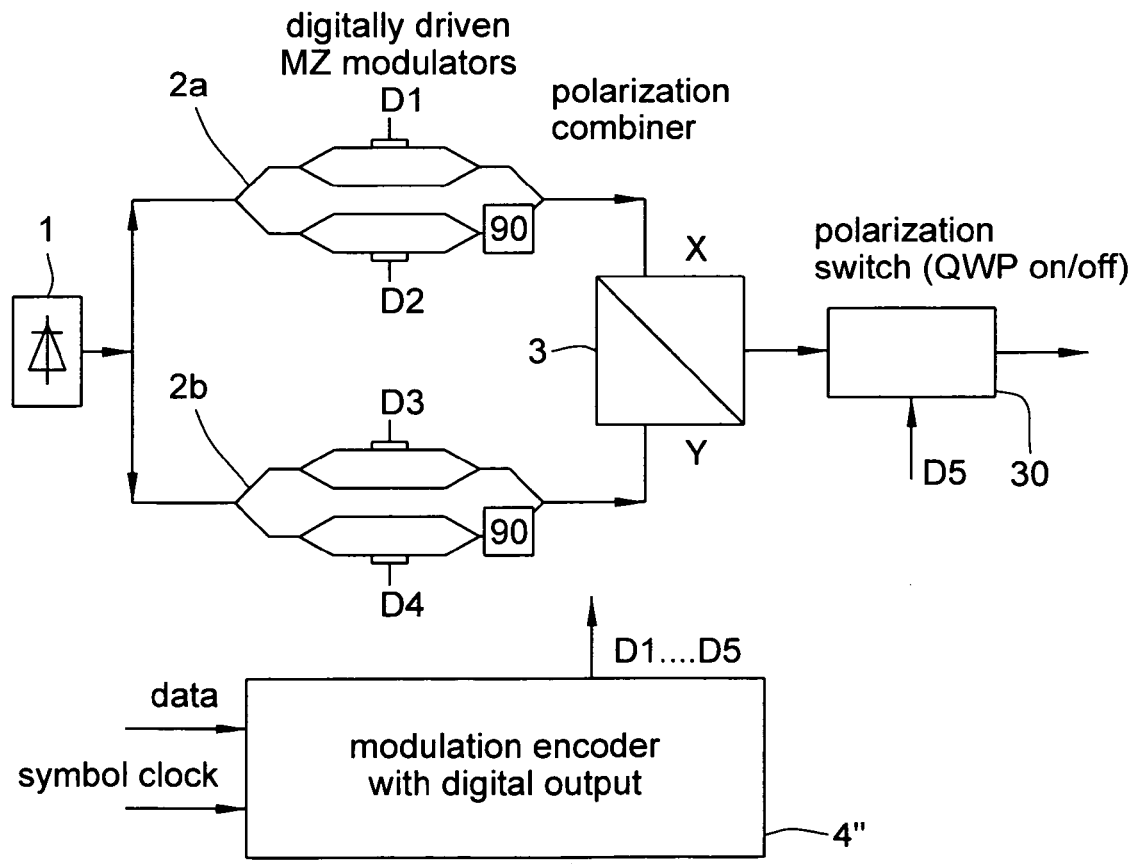
FIG. 7 illustrates a second embodiment of a POL-QAM 6/4 transmitter.

A second embodiment of a transmitter generating an optical signal modulated between all 6 SOPs is illustrated in FIG. 7. The POL-QAM 6/4 transmitter in FIG. 7 is based on the PM-QPSK transmitter in FIG. 1. Figurative elements in FIGS. 1 and 7 denoted by the same reference signs are basically the same.

In FIG. 7 an additional optical polarization modulator 30 is provided downstream of the polarization combiner 3. Here, the polarization modulator is realized as a polarization switch 30 which switches to one of the additional SOPs. The polarization switch 30 is realized by using a switchable quarter wave plate (QWP) which is capable of converting—when activated—circular polarized light to linear polarized light. This is caused by the fact that in a QWP a polarization component of the light polarized along a fast axis propagates faster than the orthogonal polarization component polarized along the orthogonal slow axis. In a QWP this difference in speed results in a quarter wavelength phase shift between both polarization components. Thus, by activating the QWP in the polarization switch 30 (e.g. by switching the QWP in the light path), the 90° phase shift between two orthogonal polarization components of a circular polarized wave (see SOP2 or SOP4 in FIG. 3) directly at the input of the polarization switch 30 may be compensated, resulting in a linear polarized wave at the output of the polarization switch 30. For switching from SOP2 and SOP4 to SOP5 and SOP6 when activating the QWP, the QWP has to be arranged in such a way at the output of the polarization combiner 3 that the axes of the QWP are tilted by 45° compared to the orthogonal polarization components of the optical signal (i.e. 45° polarized light would be coupled only in one of the axis of the QWP).

In dependency of the data to be transmitted, a modulation encoder 4" generates modulation signals D1-D5. Preferably, the modulations signals D1-D5 are binary signals. The modulation encoder 4" feds modulation signals D1-D4 to the IQ-modulators 2a and 2b and modulation signal D5 to the polarization modulator 30. The binary signal D5 activates or deactivates the QWP in the polarization switch 30 as discussed above.

Figure 8:
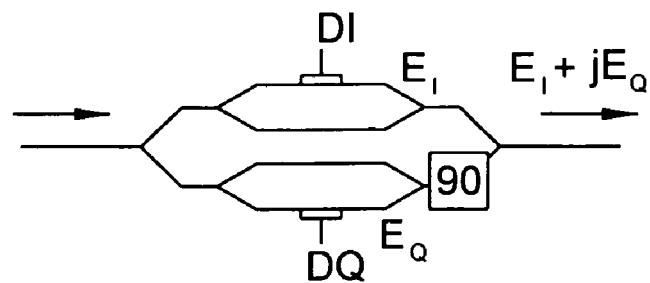
FIG. 8 illustrates the basic operation of a conventional IQ-modulator.

For modulation of the POL-QAM signal it is also an option to compute the optical fields $E_x$ and $E_y$ in the electrical domain and to generate the transmitter field via a field modulator. It is well known that a MZI with a phase modulator in its interferometer arms provides an optical output field proportional in field amplitude to the applied drive voltage D (for small values of D), provided the MZI is biased at zero (no transmission for D=0). E is proportional to sin(a·D) if the magnitude of D is larger, "a" is a coefficient. This is further illustrated by the IQ-modulator in FIG. 8. Two MZIs form two field modulators for the real (I) and imaginary (Q) components of the field $E=E_I+j\,E_Q$. The field amplitudes $E_I$ and $E_Q$ are roughly proportional to the applied drive voltages DI and DQ, respectively.

As shown in FIGS. 1, 6 and 7 already discussed above, a combination of a second IQ-modulator for the orthogonal polarization enables to modulate the orthogonal polarization, e.g. the first modulator provides $E_x=E_{x1}+j\,E_{xQ}$ for the x polarization and the second modulator provides $E_y=E_{y1}+j\,E_{yQ}$ for the orthogonal y polarization. The required drive voltages are $D_{x1}$, $D_{xQ}$, $D_{y1}$, and $D_{yQ}$ respectively. The voltages $D_{x1}$, $D_{xQ}$, $D_{y1}$, and $D_{yQ}$ can by computed in a digital (DSP) or analog electronic processor receiving the information bits. At the output of the processor time samples (e.g. with symbol rate or with double symbol rate) of all $D_{x1}$, $D_{xQ}$, $D_{y1}$, and $D_{yQ}$ are provided. The voltages $D_{x1}$, $D_{xQ}$, $D_{y1}$, and $D_{yQ}$ can be computed for example by using Tab. 1. $IQ_x$ and $IQ_y$ are already complex numbers which are proportional to the driving voltages $D_{x1}$, $D_{xQ}$, $D_{y1}$, and $D_{yQ}$ and depend on two bits bi and bj: IQ(bi,bj)=(bi−0.5)+j (bj−0.5). Real and imaginary parts of $IQ_{x,y}$ are proportional to $D_{x,y1}$ and $D_{x,yQ}$, respectively.

Figure 9:
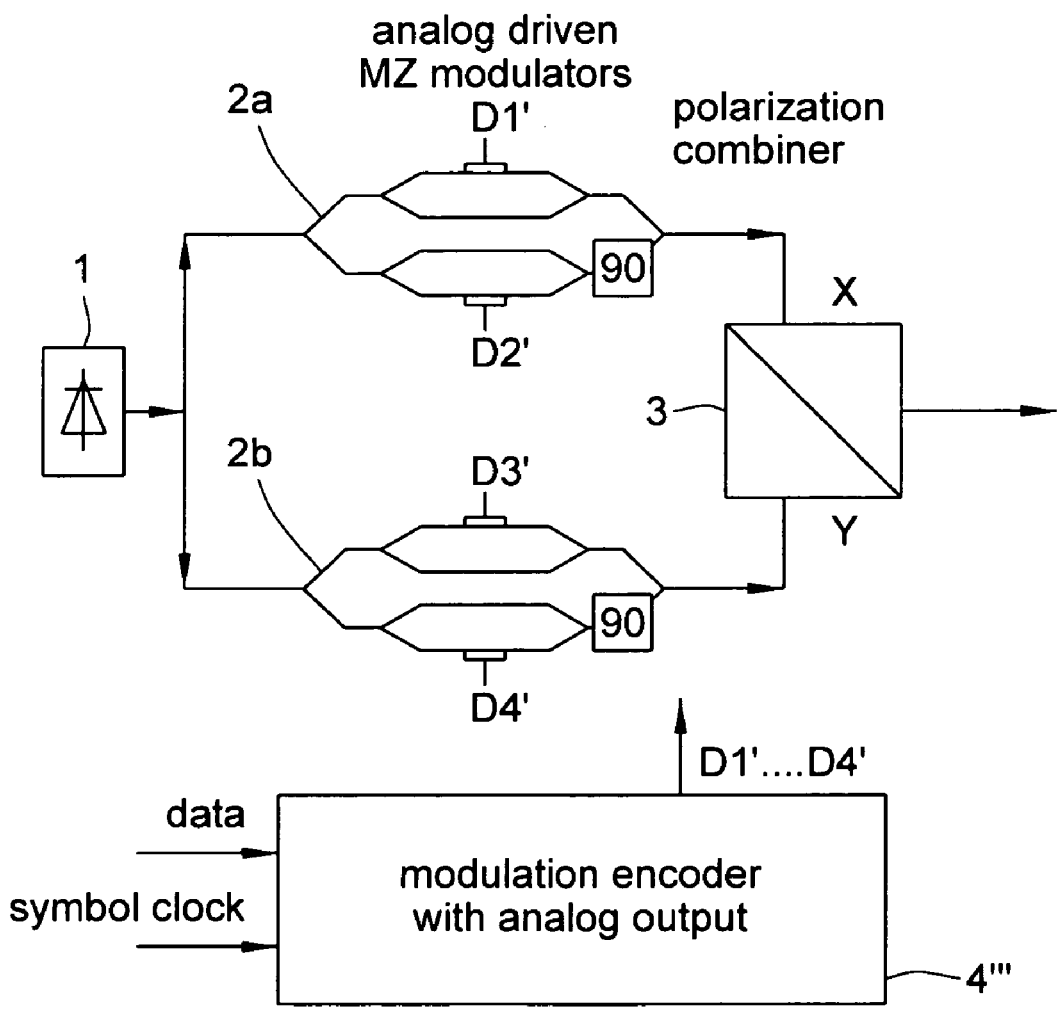
FIG. 9 illustrates a third embodiment of a POL-QAM 6/4 transmitter.

FIG. 9 illustrates a third embodiment of a transmitter which is capable to modulate the output signal between all 6 SOPs and is based on the idea to compute the necessary optical fields $E_x$ and $E_y$ of both polarization components essentially in the electrical domain in the modulation encoder 4'''. The modulation signals D1'-D4' as generated by the modulation encoder 4''' are non-binary, analog signals. The IQ-modulators 2a and 2b are operated in the analog domain. This corresponds to an OFDM transmitter which modulates an analog signal formed by the inverse Fourier transform of the subchannel signals on the optical carrier.

The inventive modulation scheme may be also used in connection with OFDM. Accordingly, each subcarrier may be modulated using the additional states of polarizations SOP5 and SOP6 as indicated in FIG. 3.

Figure 10:
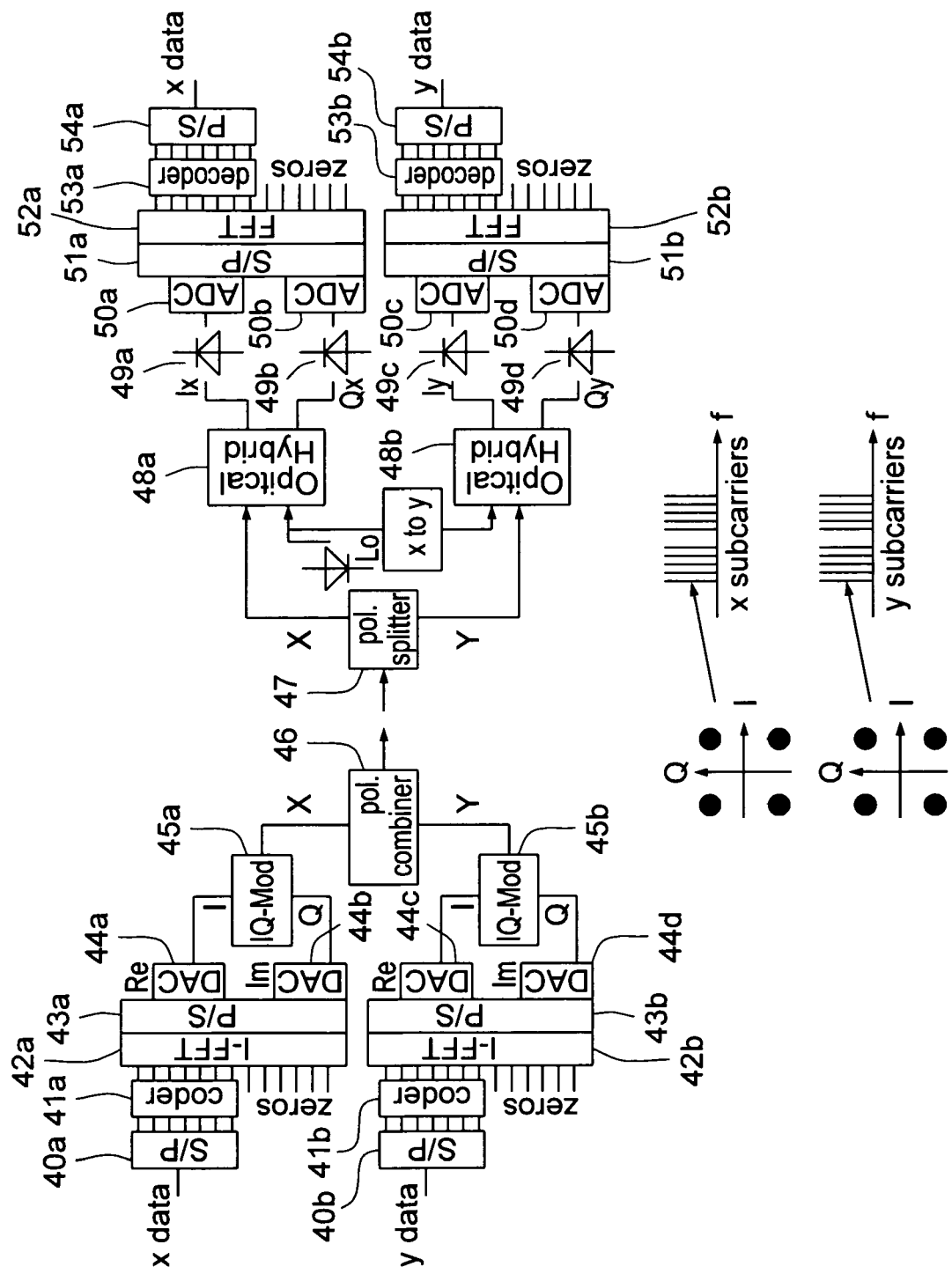
FIG. 10 illustrates a conventional PDM-OFDM transmission system.

FIG. 10 illustrates a conventional coherent PDM-OFDM transmission system comprising a PDM-OFDM transmitter and a PDM-OFDM receiver.

Data ("x data") transmitted via the x polarization plane (e.g. TE) and data ("y data") transmitted via the y polarization plane are independently processed in separate transmitter paths associated to the two polarization planes. Each transmitter path comprises a serial-to-parallel-converter 40a/b, a coder 41a/b, a I-FFT-block 42a/b for performing an inverse fast Fourier transform, a parallel-to-serial-converter 43a/b and two DACs 44a-d (digital-to-analog converter) for the inphase (denoted as "I") and the quadrature (denoted as "Q") components. The inphase and quadrature components of each polarization component x and y are modulated on an optical carrier by IQ-modulators 45a/b. The two orthogonal polarization components x and y are combined by a polarization combiner 46.

At the receiver, the polarization components x and y of the optical signal are completely separately processed. First, the polarization multiplexed signal is split into the orthogonal polarization components x and y by a polarization splitter 47. Thereafter, the polarization components x and y are split into the inphase and quadrature components by optical hybrids 48a/b. The inphase Ix and quadrature Qx components of the polarization component x and the inphase Iy and quadrature Qy components of the polarization component y are converted to electrical signals by four photodiodes 49a-d. Downstream of the photodiodes 49a-d are ADCs 50a-d (analog-to-digital converters), serial-to-parallel converters 51a/b, two separate FFT-Blocks 52a/b (fast Fourier transform) for the x and y polarization components as well as separate decoders 53a/b and parallel-to-serial converters 54a/b.

As indicated in the lower part of FIG. 10, for each subcarrier the x polarization and the y polarization are separately modulated according to a given phase constellation (e.g. QPSK). At the receiver, the x polarization component and the y polarization component are separately detected.

Since the polarization components x and y of the polarization splitter 47 are typically not aligned to the polarization components x and y at the transmitter, electronic polarization demultiplexing can be applied to recover the transmitted x signal and transmitted y signal. For this purpose, for each corresponding upper (52a) and lower (52b) subcarrier output of the FFT a complex 2·2 matrix multiplication may be applied (not shown). This multiplication performs the polarization demultiplexing operation leading to an x subcarrier signal and a y subcarrier signal which are then fed to the respective decoders 53a and 53b where the x and y subcarrier signals are decided separately and independently. Alternatively, optical polarization demultiplexing may be used (not shown) by aligning the polarization components x and y of the polarization splitter 47 to the polarization components x and y at the transmitter.

Figure 11:
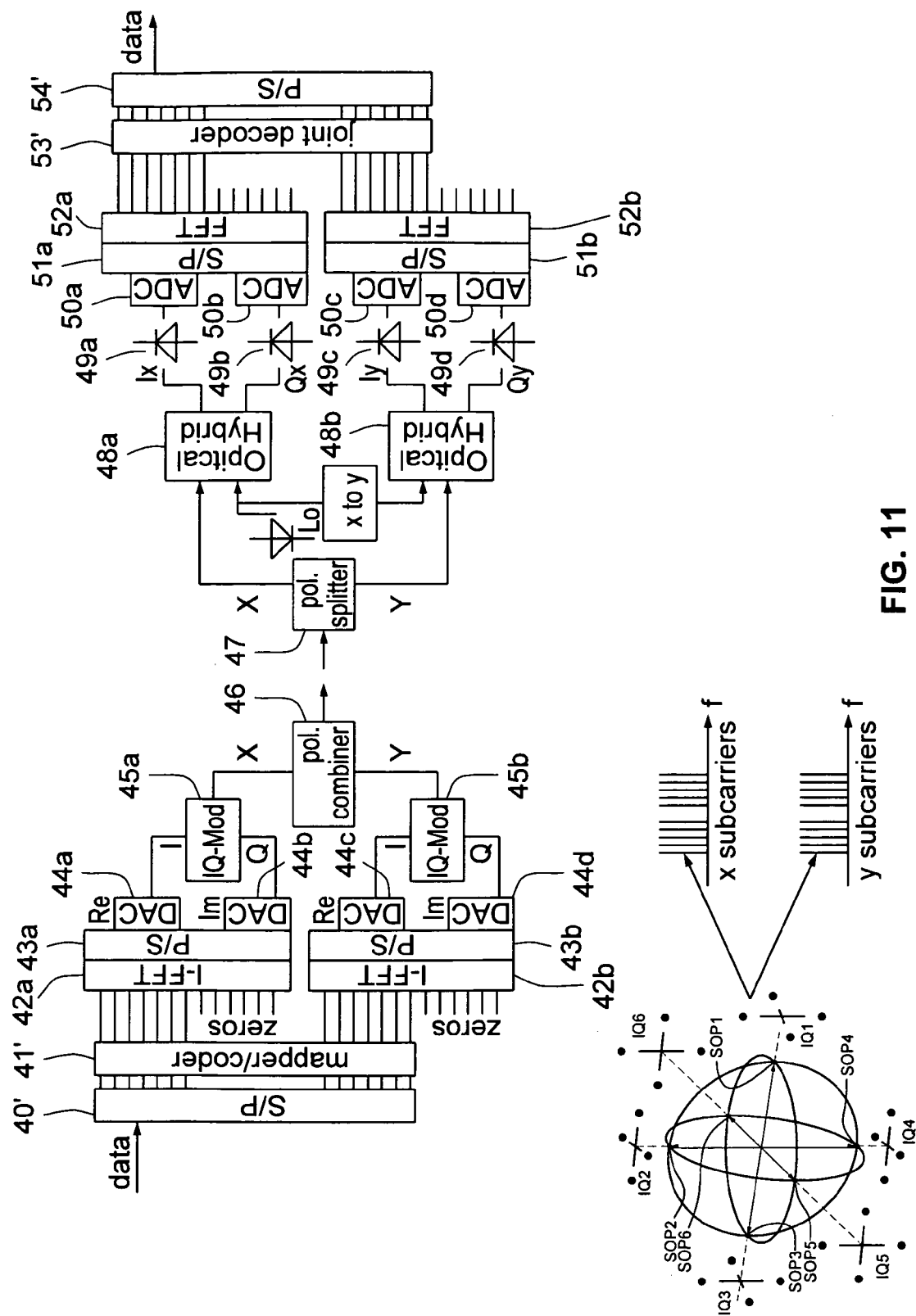
FIG. 11 illustrates an embodiment of an OFDM transmission system with subcarrier modulation according to POL-QAM.

FIG. 11 illustrates an embodiment of a coherent OFDM transmission system with subcarrier modulation according to POL-QAM. Figurative elements in FIGS. 10 and 11 denoted by the same reference signs are basically the same. In FIG. 11 the data to be transmitted is fed to a cascade of a serial-to-parallel-converter 40' and a combined mapper/coder 41'. In the combined mapper/coder 41' the necessary x and y polarization components are determined for generating an individual POL-QAM signal per each subcarrier wavelength, preferably for generating a POL-QAM 6/4 signal as discussed above. This is indicated in the lower part of FIG. 11 by the polarization and phase constellation diagram of POL-QAM 6/4 identical to the polarization and phase constellation diagram in FIG. 4. A POL-QAM 6/4 subcarrier signal is formed by the combination of an x polarization component subcarrier and y polarization component subcarrier at the same frequency.

The x and y components are transformed in the time domain by two I-FFT-blocks 42a/b. The remaining parts of the transmitter are identical to the transmitter in FIG. 10.

At the receiver, the polarization components x and y of the optical signal are initially processed and demultiplexed as discussed in connection with FIG. 10. However, in contrast to the separate decoders 53a/b in FIG. 10, the receiver in FIG. 11 comprises a joint decoder 53' for jointly deciding the x and y components forming a combined symbol per subcarrier. The joint decoder 53' may be configured to jointly deciding two consecutive symbols per subcarrier, with the two consecutive symbols forming a super symbol as discussed above. The decoded subcarrier information is fed to a joint parallel-to-serial converter 54' for recovering the original serial data stream.

It should be noted that the embodiments of the invention as discussed above may be also configured for a higher number of phase states per symbol, e.g. 8 phases per symbol as in case of 8 PSK. Moreover, QAM modulation instead of pure PSK modulation may be used, in particular for the IQ-modulators discussed above.

The invention claimed is:

1. A modulation method for optical communication, comprising the step:
   generating an optical signal modulated between a plurality of different states of polarization and between different phase states,
   wherein the states of polarization do not all lie on a same great circle on the Poincaré sphere,
   wherein the plurality of states of polarization comprises:
      first states of polarization defining a single great circle on the Poincaré sphere, and
      one or more second states of polarization outside the great circle, and
   wherein
   in a second state of polarization one of two orthogonal polarization components of the optical signal is deactivated.

2. The method of claim 1, wherein the step of generating an optical signal comprises the steps of:
   phase modulating two optical waves; and
   polarization combining the phase modulated optical waves.

3. The method of claim 2, wherein the step of generating an optical signal further comprises the step of:
   selectively deactivating one of the two optical waves, the two waves assigned to two orthogonal polarization components of the optical signal.

4. The method of claim 1, wherein
   the optical signal is modulated between 6 states of polarization and 4 phase states in each state of polarization, and
   the optical signal comprises a sequence of optical symbols, with a symbol having one of the states of polarization and one of the phase states, and in average more than 4 bits are encoded per symbol.

5. The method of claims 4, wherein 9 bits are encoded per two optical symbols.

6. The method of claim 1, wherein the method generates an OFDM signal comprising a plurality of combined subcarrier signals, wherein each combined subcarrier signal is modulated between the plurality of states of polarization.

7. A transmitter for optical communication, comprising
   means for generating an optical signal modulated between a plurality of different states of polarization and between different phase states,
      wherein the plurality of states of polarization comprises first states of polarization defining a single great circle on the Poincaré sphere,
      wherein the plurality of states of polarization further comprises one or more second states of polarization outside the great circle
   wherein
   the means for generating the optical signal are configured in such a way that one of two orthogonal polarization components of the optical signal is deactivated in a second state of polarization.

8. The transmitter of claim 7, wherein the means for generating an optical signal comprise:

means for phase modulating two optical waves; and means for polarization combining, downstream of the means for phase modulating.

9. The transmitter of claim 8, wherein the means for generating the optical signal further comprise:

means for selectively deactivating one of the two optical waves, the two waves assigned to two orthogonal polarization components of the optical signal.

10. The transmitter of claim 8, wherein
the means for generating the optical signal further comprise:

a modulation encoder receiving data to be transmitted and configured to generate—in dependency on the data—non-binary modulation signals fed to the means for phase modulating, with the non-binary modulation signals selecting the state of polarization.

11. The transmitter of claim 8, wherein the means for generating the optical signal further comprise:

a polarization modulator, downstream of the means for polarization combining.

* * * * *